(12) United States Patent
Porteboeuf

(10) Patent No.: US 11,537,715 B2
(45) Date of Patent: Dec. 27, 2022

(54) SECURED EXECUTION CONTEXT DATA

(71) Applicant: SECURE-IC SAS, Cesson-Sévigné (FR)

(72) Inventor: Thibault Porteboeuf, Paris (FR)

(73) Assignee: SECURE-IC SAS, Cesson-Sévigné (FR)

( * ) Notice: Subject to any disclaimer, the term of this patent is extended or adjusted under 35 U.S.C. 154(b) by 232 days.

(21) Appl. No.: 15/909,253

(22) Filed: Mar. 1, 2018

(65) Prior Publication Data

US 2018/0260564 A1   Sep. 13, 2018

(30) Foreign Application Priority Data

Mar. 8, 2017 (EP) ..................................... 17305248

(51) Int. Cl.
*G06F 21/56* (2013.01)
*G06F 21/52* (2013.01)
(Continued)

(52) U.S. Cl.
CPC ............ *G06F 21/566* (2013.01); *G06F 11/28* (2013.01); *G06F 11/3636* (2013.01);
(Continued)

(58) Field of Classification Search
CPC ............... G06F 21/50–54; G06F 21/57; G06F 2221/03–034; G06F 21/566; G06F 21/71;
(Continued)

(56) References Cited

U.S. PATENT DOCUMENTS

| 5,771,348 A | 6/1998 | Kubatzki et al. |
| 2008/0066075 A1 | 3/2008 | Nutter et al. |

(Continued)

FOREIGN PATENT DOCUMENTS

| CN | 101145173 A | 3/2008 |
| JP | 2014-033324 | 2/2014 |

(Continued)

OTHER PUBLICATIONS

Korean Office Action for KR application No. 10-2018-0027067, dated Jun. 12, 2019.
(Continued)

*Primary Examiner* — Daniel B Potratz
(74) *Attorney, Agent, or Firm* — Meagher Emanuel Laks Goldberg & Liao, LLP

(57) ABSTRACT

There is disclosed a circuit for monitoring the security of a processor, wherein the circuit is configured to access a memory configured to store execution context data of a software program executed by the processor; to determine one or more signatures from said execution context data; and to compare said signatures with predefined signatures to monitor the security of the processor (110). Developments describe that context data can comprise control flow data, that a signature can comprise a hash value or a similarity signature, or that the integrity of signatures can be verified for example by using a secret key (e.g. obtained by random, or by using a physically unclonable function). Further developments describe various controls or retroactions on the processor, as well as various countermeasures if cyber attacks are determined.

12 Claims, 4 Drawing Sheets

(51) Int. Cl.
G06F 21/54 (2013.01)
G06F 21/71 (2013.01)
G06F 11/36 (2006.01)
G06F 11/28 (2006.01)
G06F 13/28 (2006.01)
H04L 9/08 (2006.01)
H04L 9/32 (2006.01)
H04L 9/40 (2022.01)

(52) U.S. Cl.
CPC ............ G06F 13/28 (2013.01); G06F 21/52 (2013.01); G06F 21/54 (2013.01); G06F 21/71 (2013.01); H04L 9/0825 (2013.01); H04L 9/0866 (2013.01); H04L 9/3242 (2013.01); H04L 63/123 (2013.01)

(58) Field of Classification Search
CPC ........ G06F 11/28; G06F 13/28; H04L 9/0825; H04L 9/0866; H04L 9/3242; H04L 63/123
See application file for complete search history.

(56) References Cited

U.S. PATENT DOCUMENTS

| | | | | |
|---|---|---|---|---|
| 2009/0285390 | A1* | 11/2009 | Scherer | G06F 21/565 380/44 |
| 2011/0145919 | A1* | 6/2011 | Whelihan | G06F 21/57 713/100 |
| 2012/0331307 | A1* | 12/2012 | Fernandez Gutierrez | G06F 12/1408 713/190 |
| 2014/0037089 | A1 | 2/2014 | Itoh et al. | |
| 2014/0082327 | A1 | 3/2014 | Ghose | |
| 2014/0082724 | A1* | 3/2014 | Pearson | G06F 21/575 726/22 |
| 2014/0189365 | A1 | 7/2014 | Cox et al. | |
| 2018/0060561 | A1* | 3/2018 | Pedersen | G06F 21/562 |

FOREIGN PATENT DOCUMENTS

| | | |
|---|---|---|
| WO | 2005052795 A1 | 6/2005 |
| WO | 2016087652 A1 | 6/2016 |

OTHER PUBLICATIONS

Kleber et al.: "Secure Execution Architecture based on PUF-driven Instruction Level Code Encryption", http://eprint.iacr.org/2015/651.pdf, Dec. 31, 2015.
European Search Report for 17305248.1 dated Jul. 4, 2017.
English Translation of First Office Action for corresponding Chinese Application No. 201810191139.7, dated Apr. 7, 2021.

* cited by examiner

SECURED EXECUTION CONTEXT DATA

TECHNICAL FIELD

This patent relates to the field of digital data processing and more particularly to the field of secured processors.

BACKGROUND

Embedded systems face ever increasing risks of cyber attacks attempting to gain control of host devices. A diversity of existing approaches is described to safeguard embedded systems.

Antivirus software protects the system only partially. Such systems rely on the assumption that some signature of malware code can be found to identify its presence. Corresponding ad-hoc solutions can be performed too late, for example after the system has been corrupted, as malware code can sometimes only be identified as a result of a successful attack. Moreover, antivirus programs are usually demanding in terms of memory and CPU resources. Such protections and their updates are hardly deployable on embedded systems.

Another known approach consists in protecting the inner mechanisms of the potentially vulnerable programs. Such solutions can be performed in software or in a combination of software and hardware. Hardware implementations require modifications of the processor architecture. Software implementations generally involve the operating system, for example by protecting a limited number of sensitive data as a return address of a sub-routine. For example, a "canary" (i.e. a random value) is added just before returning an address into the stack, in order to detect overflows. If the canary is overwritten, a security exception is raised. Such a counter-measure slows down the performance, as additional verifications are computed in software. It also consumes more memory as *canaries* need to be stored. Finally, some attacks can manage to bypass the countermeasure by guessing or disclosing the canary value, or even by using a "write-what-where" corruption, which allows modifying the return address without modifying the canary.

Another existing approach, named "pointer checking", consists in checking for pointer overflows. A pointer is associated with meta-information. Said meta-information typically contains a start address and the size of the allowed memory area for a given pointer. During each pointer use, the pointer value is checked against the meta-information to detect overflows. The implementation can be performed in software or in a combination of software and hardware solutions. In all cases, the memory and speed overhead can be significant. Extensions to the memory are sometimes proposed. To obtain an effective protection, the architecture of the processor has to be modified accordingly.

Another existing approach named "dynamic information flow tracking" (acronym DIFT) aims to identify and to track the unsafe (or tainted) data. Unsafe or tainted data generally comes from program interfaces (e.g. network, user inputs). Propagation of tainted data in the memory and CPU can be tracked by the system. If security critical parameters such as the program counter or the current instruction become tainted, the DIFT system considers the program to be compromised and an alarm is raised. The main drawback of this approach is the difficulty to create efficient propagation rules with a good compromise on performance (in particular with respect to management of false-positives and fault-negatives). Currently, DIFT solutions present different compromises. Some present a very partial protection with little overhead. Some others offer an efficient protection but with a more significant overhead and can require complex modifications of the hardware architecture.

Another existing approach named "Address Space Layout Randomization" (acronym ASLR) consists in randomizing the memory space, in order to make it more difficult to accurately corrupt or disclose sensitive data, their positions being unknown. This technique generally helps making attacks less practical but usually does not allow detecting them once done.

Another existing approach named "Control Flow Integrity" (acronym CFI) consists in detecting the modification of the flow control. As a prerequisite, a software application which has to be secured must be analyzed beforehand, to identify all possible instructions' flows. During the execution of the software application, the instruction flow is then checked in real-time. As a drawback, the performance can be decreased significantly.

The patent literature discloses several approaches. For example, US patent referenced U.S. Pat. No. 5,771,348 entitled "Method and arrangement for enhancing the security of critical data against manipulation" discloses a method to handle the security of critical register data, by manipulating pointers, code words and validity checks of codewords. This approach presents limitations.

There is consequently a need for methods and systems of securing embedded systems providing improved resistance to cyber attacks thus enhanced security.

SUMMARY

There is disclosed a circuit for monitoring the security of a processor, wherein the circuit is configured to access a memory configured to store execution context data of a software program executed by the processor; to determine one or more signatures from said execution context data; and to compare said signatures with predefined signatures to monitor the security of the processor. Developments describe that context data can comprise control flow data, that a signature can comprise a hash value or a similarity signature, and, in a potentially independent embodiment, that the integrity of signatures can be verified for example by using a secret key (e.g. obtained by random, or by using a physically unclonable function). Further developments describe various controls or retroactions on the processor, as well as various countermeasures.

Advantageously, embodiments of the invention enable to safeguard the security of embedded systems against cyber attacks.

Advantageously, remarkable and/or critical and/or sensitive elements of data associated with software execution are securely backed up or saved, along required data saved into the memory.

Advantageously, a processor can be coupled with additional hardware (e.g. a circuit according to the invention), which is dedicated for security features. Said additional hardware in particular allows the software to securely backup critical information in memory along with signature information and/or integrity information which cannot be forged by the attacker.

Advantageously, said circuit or additional hardware allows to securely backup critical data in a dedicated memory or memory area, which cannot be accessed by otherwise unprivileged or low-integrity software.

Advantageously, embodiments of the invention enable hardware-enabled security features, for example by enabling the CPU to detect corruptions, just-in-time and with higher performance.

Advantageously, the addition of meta-information in the buffer is not required. In an embodiment, only one signature (checksum value or hash value, for example of the processor's registers) is determined and added into the memory.

Advantageously, embodiments of the invention protect the integrity of the critical data without adding a significant overhead.

Advantageously, embodiments of the invention allow handling various data structures, thereby presenting a large coverage of protection use cases.

Advantageously, some embodiments of the invention do not imply additional computing power resources.

Advantageously, embodiments of the invention can benefit from dedicated hardware acceleration. Dedicated hardware acceleration indeed allows for processor offloading and better power efficiency in embedded systems.

Advantageously, embodiments of the invention generally do not require a modification of the hardware architecture of the processor (which could be complex and costly).

Advantageously, in particular by contrast with known approaches, embodiments of the invention do not slow down the performance of the processor and in particular do not require performing verifications handled, in particular in software.

Advantageously, embodiments of the invention can take the form of hardware (e.g a circuit or extension) and/or software (e.g. executable software instructions such as trap handler). For example, in a specific embodiment, a SPARC processor can be associated with a modified windows overflow trap handler and/or a window underflow trap handler. In addition of saving or copying the contents of the registers into the memory, the windows overflow trap handler can call a specific library of dedicated software to compute the checksum. In response to an underflow trap handler, one or more verifications can be performed (at the register level).

BRIEF DESCRIPTION OF DRAWINGS

Embodiments of the present disclosure will now be described by way of example with reference to the accompanying drawings in which like references denote similar elements, and in which.

DETAILED DESCRIPTION

Figure 1:
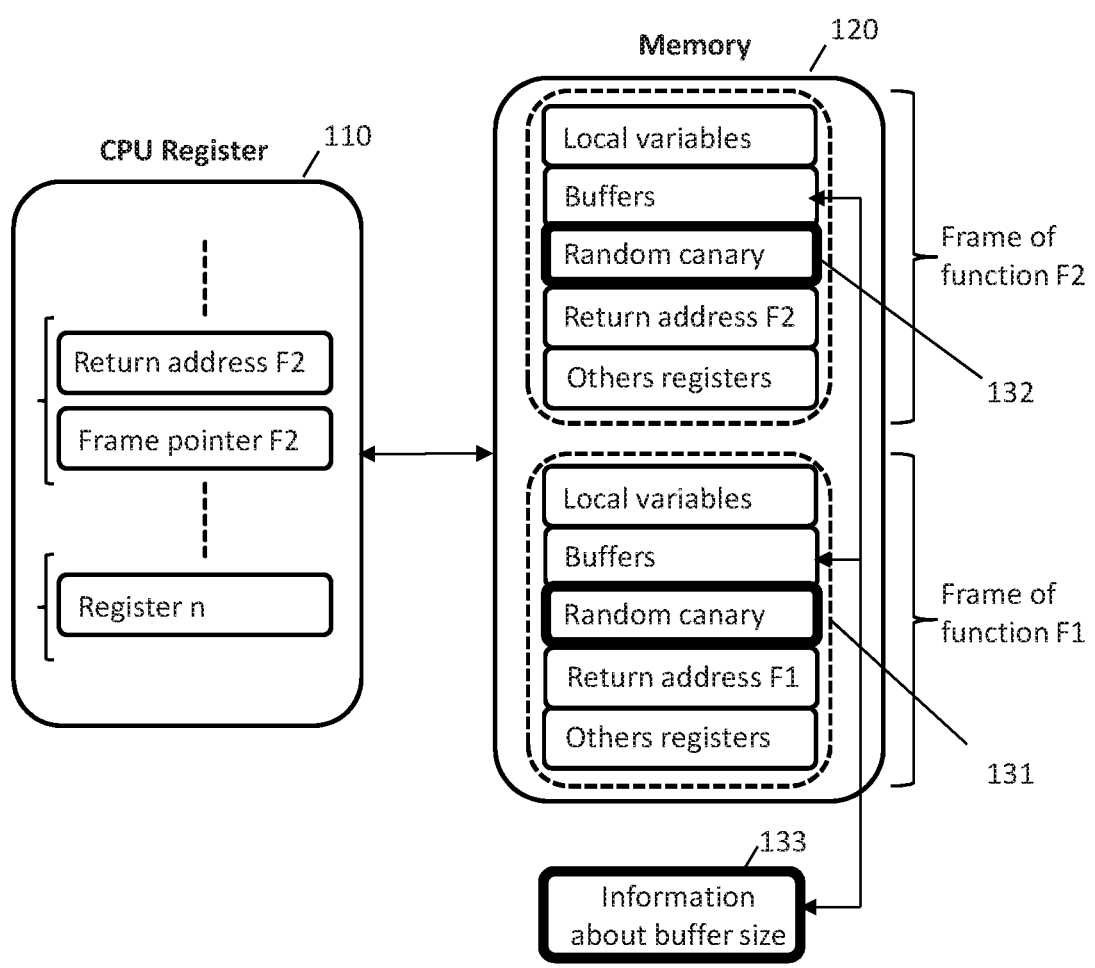
FIG. 1 illustrates some protection mechanisms.

FIG. 1 illustrates some protection mechanisms.

The register 100 of the processor or Central Processing Unit C.P.U. 100 communicates with a memory 120. Software programs which are executed are associated with different frames for different functions (for example frames 131 of a function F1 calling for a frame F2 132). In order to protect these frames (execution context data), so-called "*canaries*" are used to protect critical or sensitive data, including execution context data. *Canaries* or canary words are known values that are placed between a buffer and control data on the stack to monitor buffer overflows 133. When the buffer overflows, the first data to be corrupted will usually be the canary, and a failed verification of the canary data is therefore an alert of an overflow, which can then be handled, for example, by invalidating the corrupted data. In the present example, a random canary (131, 132) is added just before returning an address into the stack, in order to detect overflows. If the canary is overwritten, a security exception is raised.

Software programs are usually written using procedures. When called, a procedure of a software program produces execution context data which comprises for example input parameters, data and control flow information. Optionally, a procedure can produce result(s) and/or a return value. Such a procedure is commonly named "function".

Optionally, a procedure or function can be associated to a data object in memory. Such a procedure or function can sometimes be named a "method".

The context of a procedure, namely the execution context data, comprises information relative to the execution of the current procedure. The context can comprise (non-exhaustive list) data such as a return address, a stack pointer, a frame pointer, local variables and buffers, input arguments and return value.

Corruption of this context can enable the attacker to modify critical data and take control of the execution flow of the program.

Embodiments of the invention provide methods and systems to secure the context of execution of one or more functions.

As used herein, a (software) program designates a plurality of executable and ordered instructions (i.e. a sequence of instructions). Instructions can be executed by one or more processors or cores of processors (multi-core processor and/or many-core processor). A software program can comprise a plurality of "functions" (also named "methods", which are called successively, in sequence, or in a defined order).

A function (or method) requires "control flow information" or "control flow data" (such as a return address for example) and/or requires data (such as stack pointer, frame pointer and register backup values for example) to be saved and restored upon call/return of other functions. Advantageously, said control flow data can be leveraged for security purposes.

In an embodiment, there is described a circuit monitoring the security of a processor, wherein the circuit is configured to:—access a memory configured to store execution context data of a software program executed by the processor;—determine one or more signatures from said execution context data;—compare said signatures with predefined signatures to monitor the security of the processor.

In an embodiment, the circuit is configured to access the memory independently from (or out/outside the control of) the processor.

In an embodiment, the circuit is configured to access context data directly from (under the direct control of) the processor, or directly from the processor components or subcomponents.

In an embodiment, the circuit is configured to access context data on-the-fly, i.e. when said data is transmitted (or communicated or transferred) between the processor and memory and/or between the processor and MMU and/or between the processor and cache memories and/or between cache memories of different levels and/or between cache and memory and/or between different processors cores in a multicore system and/or between different caches belonging to different cores in a multicore system.

In an embodiment, there is described a system comprising a processor, a circuit and memory, wherein the processor and circuit are configured to independently access the memory to store execution context data of a software program executed by the processor and to compare, based on signatures, said execution context data to determine an attack of said processor.

In an embodiment, there is described a system comprising a processor and a circuit interconnected by a memory (unit), wherein the processor is configured to execute a software program; wherein the processor is configured to transmit execution context data of said software program to the circuit; wherein the processor is configured to identify predefined execution context critical data from the execution context data; wherein the processor is configured to transmit said identified predefined execution context critical data to the circuit and to the memory; wherein the circuit is configured to receive execution context data from the processor executing the software program; wherein the circuit is configured to determine a signature from said transmitted predefined execution context critical data; wherein the circuit is configured to copy (e.g. store, archive) said signature into the memory; and wherein the processor (or the circuit) is configured to retrieve said signature from the memory and to compare said signature with one or more predefined signatures.

In an embodiment, the "circuit" according to the invention is a hardware "extension" to the processor.

In an embodiment, the circuit and the target processor are designed in relation to each other or/and manufactured together, i.e. are parts of a same manufactured product (they are connected parts in a particular configuration). In some embodiments, the circuit is connectible or releasable or attachable or linkable or moveable onto/next to the target processor. The circuit thus can be used as an additional or external or supplemental hardware (for security or test purposes). In an embodiment, the association of the circuit and of the processor is reversible. In an embodiment, the association is irreversible (meaning that the circuit is destroyed in case of attempt to disassemble the entities). The physical connection for example can use adhesive and/or glue and/or electrical connection and/or magnetic connection. The different parts of the global system thus can be rearranged in diverse ways, statically or dynamically (e.g. over time). Arrangements can physically occur in 2D (plane) but also in 3D. The topology of the arrangement of processors, circuits and memory units can be such as to optimize security and/or performance, e.g. minimizing access latency delays.

In an embodiment, the circuit is instantiated as a "soft-core" in a programmable logic device. Such programmable logic devices include for example FPGAs and CPLDs.

In an embodiment, both the circuit and the target processor are instantiated as "soft-cores" in a programmable logic device.

In an embodiment, the target processor is manufactured together with the programmable logic array, the circuit being implemented as a soft-core in the programmable logic array at run-time.

In an embodiment, the circuit is manufactured together with the programmable logic array, the target processor being implemented as a soft-core in the programmable logic array at run-time.

In an embodiment both the circuit and the processor are manufactured together with the programmable logic, the circuit being configurable to be connected to the manufactured processor or to be connected to a soft-core processor in the programmable logic array.

Beyond a mere copy of the critical data from the processor internal registers to the memory (prior art), the system according to the disclosure uses an "intermediary" circuit. To some extent, this circuit serves as a "safe harbor". It copies execution context data, so that if execution context data is later or further compromised and/or attacked and/or otherwise corrupted in the processor, cache or memory, a safe copy can be retrieved from the circuit and be later used for analysis and later corrective action (if needed). In other words, the "additional" or "extra" or "safe" copy of execution context data can serve as a further security or fallback to detect and determine an attack performed against the processor and to take appropriate counter-measure(s).

Alternatively, the circuit can be designed or arranged to save a smaller amount of data than the actual amount of context data. Such an embodiment in particular can be advantageous to spare storage space, communication bandwidth and/or computing resources. The limited amount of data can be later retrieved, for example to check the integrity of the actual context data. In an embodiment, the limited amount of data can correspond to a partial subset of the execution context data, or a data set derived from the context data using for example, but not limited to, checksum algorithms, cryptographic MAC or HMAC algorithms, redundancy codes, error correction or detection codes, cyclic redundancy codes, and/or turbo codes. In some embodiments, public-key cryptography can be used to produce digital signatures of the context data. Such applicable public-key cryptography algorithms can include but are not limited to RSA, DSA, ECDSA, El Gamal, and McEliece. Advantageously, the selected cryptographic algorithm can be a "post-quantum" cryptographic algorithm (i.e. not subject to meaningful attacks or cryptanalysis with a quantum computer, designed to be immune to such quantum attacks).

In an embodiment, the circuit according to the invention can act as a "watchdog" or a "daemon" which can act independently from the processor. If the processor is compromised at some point, the circuit can detect and/or determine existence of an attack because of the divergence in execution context data. A divergence means a difference, either in raw execution context data or in signatures of subsets of said raw execution context data.

In an embodiment, the characteristic of "independence" is relative and not absolute (to some extent the processor and the circuit share the same power or energy source). In an embodiment, the circuit is totally independent from the processor (for example it can be part from separated electronics, with no common point of failure; for example, the circuit can be powered by a source of energy which is distinct from the one of the processor).

A "memory" according to the invention can be named "memory unit" or "memory circuit" or "data cache". It is generally a tangible electronics circuit, generally centralized in space (but alternatively it also can be distributed in space). In computer architecture, the "memory hierarchy" is a concept used for discussing performances, in particular for response times. Memory registers are the fastest, then memory caches (L1 to L4), then random access memory, then flash memory and then mass storage (e.g. SSD hard drive). A "memory" according to the invention can be one or more of, but not limited to, a memory register, a memory cache, a random access memory, a flash memory or even a hard drive.

The nature of the memory (or memory units) can be diverse. A memory can be volatile, or non-volatile, or can even combine the use of both volatile and non-volatile memory units. A volatile memory can use one or more of a RAM, DRAM (e.g., DDR SDRAM) SRAM, T-RAM, and Z-RAM. Using volatile memory generally presents the advantage of improving read/write performance, with a lower cost/footprint than non-volatile writable memories. A non-volatile memory can use one or more of a Mask ROM, PROM, EPROM, EEPROM, NVRAM, Flash memory Solid-state storage, nvSRAM FeRAM MRAM PRAM. Using non-volatile memory generally presents the advantage of allowing retaining previously stored information upon reboot and/or power cycle. In an embodiment, one or more memory units can use 3D XPoint, CBRAM, SONOS, RRAM, Racetrack memory, NRAM, Millipede memory, FJG RAM.

In an embodiment, the memory (or "cache") is shared between the processor and the circuit according to the invention: both do copy and store execution context data and/or critical execution context data into the memory and said data are further compared.

In the context of the disclosure, it is generally not required that the memory is trusted, or trustable. In some embodiment, trust can rely on a secret key used for generating authenticated checksums of the execution context data (forging checksums is prevented and memory tampering would be detectable). In some embodiments, the memory cannot be trusted, in parts or in full. In such embodiments, the memory can comprise further defense mechanisms and/or its structure can configured to improve robustness. In an embodiment, the "memory" comprises a plurality of memories (circuits or units). The memory can be tiered (e.g. SSD caching). Partitioning can be used. Isolation or compartmentalization can be used, from the physical and/or logical standpoint. Access rights can be handled in a manner to impede data corruption. For example, there can be used a MMU (Memory Management Unit). In some embodiments, sandboxing mechanisms can be used, thereby allowing separating the memory space of different processes and/or privilege levels.

In an embodiment, the processor and (verification) circuit can access physically and/or logically distinct memories, such that the attacker needs to be able to modify both memories in a coherent way to achieve a successful attack. For example, two physically different memory units can be used. While a same physical memory unit can be used, different logical addresses can be used. In an embodiment, the memory used by the verification circuit has additional protection mechanisms, for example for fault detection, hardware probing and hardware modification. In such an embodiment, the protection of the integrity of the signature data can be improved, thereby increasing the difficulty for an attacker to perform a successful attack.

In an embodiment, access is bidirectional between the memory and the processor. In an embodiment, access is unidirectional between the memory and the processor. In an embodiment, access is bidirectional between the memory and the circuit. In an embodiment, access is unidirectional between the memory and the circuit. Different arrangements thus can be obtained. For example, in an embodiment, access can be unidirectional between processor and memory, while access can be bidirectional between circuit and memory (this ensures that data only can evade the processor, while the circuit can fully interact with the memory).

It is underlined that the tryptic "processor-memory-circuit" is one among many possible physical implementations. While the description mostly considers single entities (one processor, one memory, one circuit), a plurality of such circuits can be considered and arranged in many different ways. The processor can indeed designate one or more cores of a processor (for example from a multi-core processor or of a many-core processor). In particular, processor(s) can be centralized in space (CPU) but can also alternatively be distributed in space (e.g. clusters, farms of servers, etc). Likewise, the memory can designate a plurality of memory circuits, centralized or distributed in space. The circuit also can correspond to a plurality of circuits. In an embodiment, the tryptic (or scheme or assembly) "processor-memory-circuit" can be virtualized (either partially or as a whole), in order to share physical resources with other such tryptic assemblies (e.g. hardware virtualization, programmable logic devices).

The higher-level of description of the invention can be used at lower granularity levels, using different combinations of the general tryptic processor-memory-circuit. For example, a system according to the invention can comprise a multi-core processor (i.e. a plurality of cores), a plurality of memory units and a centralized circuit accessing one or more of the memory units.

In particular, the tryptic "processor-memory-circuit" can be repeated in a fractal manner (not represented). For example, in an embodiment wherein a particular subset of critical security parameters is saved (and later restored), a second memory along the first main memory can be used and a second circuit can be used to save and compute signatures from data stored in said second memory. In turn, specific data stored in said second memory can be saved into another memory unit, etc. In an embodiment, a tryptic "processor-memory-circuit" can be virtualized or emulated on top of another physical, virtual or emulated tryptic "processor-memory-circuit".

The diversity of possible physical implementations further presents different opportunities (trade-offs/compromises) to implement further developments to the invention. Among other developments, statistical approaches can be used (for example to statistically address the corruption of a given processor core, while lowering hardware requirements).

In an embodiment, execution context data is copied. In an embodiment, execution context data is displaced or moved (cut/paste).

Temporal aspects are now discussed.

The capture or backup of execution context data can be performed in various ways.

In an embodiment, the method is context-driven. Upon determination of a change in context, a signature of execution context data e.g. a checksum is computed. For example, if execution context data is pushed to the stack, the checksum is computed and saved. If a context is pulled from the stack, the checksum is checked or verified. In an embodiment, context switch between software programs can trigger the capture or reception of execution context data. Execution context data can indeed change suddenly (quantitatively) and/or significantly (qualitatively) when the operating system handles different software programs.

In an embodiment, data capture can be time-driven (e.g. a clock heartbeat can be used). "Snapshots" of execution context data are for example extracted or captured at predefined time intervals (e.g. fixed, cyclic, random, regular durations). By using one or more independent circuits and/or one or more independent memory units, the backup or capture of execution context data can be handled in an appropriate manner. The clock frequency of the processor can serve as a basis to determine the data capture frequency. Data capture can be regular or irregular (e.g. predefined time intervals and/or random time intervals within predefined bounds).

In an embodiment, the data capture can be event-driven. In an embodiment, for example, the data capture can depend on volumes of accessible data (e.g. upon excess of a predefined threshold, execution context data is transferred or copied). In an embodiment comprising a SPARC processor; the signatures or checksums can be computed for instance after each register windows overflow. Alternatively or cumulatively, the signature or checksum can be checked after each registers windows underflow. In an embodiment, one or more signatures (or checksums) can be computed upon function call prior to leaving a function. Alternatively or cumulatively, a signature or checksum can be checked upon function call or return, hardware or software interrupt, exception, system call or context switch between different tasks on a multi-task system, prior to entering (or reentering) a function. In an embodiment, the presence of particular predefined data or data signature(s) can trigger data capture. In an embodiment, the granularity of the data capture triggering can involve one specific executable instructions or set of instructions. In an embodiment, specific data structures in memory comprise, but are not limited to, heaps, and/or linked lists, and/or double linked lists, and/or stacks, and/or FIFOs, and/or hash tables, etc. Event-driven signature or checksum generation and/or verification for example can be triggered upon item creation, modification and removal.

In an embodiment, the copy of execution context data can be triggered by a combination of the preceding aspects (i.e. be dependent on context(s) and/or time and/or event(s)).

Further temporal aspects are now described (occurrences of comparisons performed on execution context data, signatures or combination thereof).

The tamperedness (ability or capacity to tamper by an attacker) depends on multiple parameters. For example, it is conditional to the localization of the data (e.g. whether it is physically stored within the CPU or outside of it e.g. in external memory). It also sometimes depends on the portion of the code being executed (generally correlated to execution time, but the relationship is not necessarily deterministic, especially on modern systems). In some cyber attacks, the attacker may try to exploit memory corruption happening in a given portion of code, to tamper with data belonging to another portion of code, so that this other portion of code will produce a desired malevolent behavior.

Different embodiments of the invention can avoid or prevent such attacks.

In an embodiment, the processor accesses first the memory via the circuit; if later on the processor is compromised, then the circuit can determine a mismatch and possibly an attack.

In an embodiment, signatures (and/or checksums) are advantageously computed before data can be tampered. Through a learning phase, specific to the processor, generally performed offline or during personalization phase of the device, a set of signatures can be defined. Some predefined signatures (e.g theoretical or determined from other systems and processors) also can be loaded. Some signatures also can be dynamically defined (a retroaction feedback can be added to render the circuit more "intelligent"). The circuit can be configured with (secured) I/O communications, so that to be able to receive signatures from other controlling systems (e.g. from Cloud).

In an embodiment, signatures are progressively stacked and/or accumulated and/or stored. By computing signatures progressively, the preceding attack scenario is for example advantageously avoided or at least prevented. Such a progressive establishment of a safe harbor can for example occur as data is being transferred from the processor to the memory. It also can be constituted at exits of code portions (which the execution context data "belongs" or corresponds to or is associated with).

In an embodiment, the normal behavior of the processor is captured and securely stored for further reference. More generally, the capture can be performed using signatures but other mechanisms can be used; the secure storage can use mechanisms such as authentication, e.g. challenge response, physical hardening, the use of distributed systems, etc; the storage can use permanent (e.g. irreversible storage or cache (e.g. ephemeral) storage.

In an embodiment, execution context data comprises control flow data. Control flow data generally comprises data such as return address, input parameters and registers' backup data.

In an embodiment, the signature comprises a hash value. The signature can be a checksum or a hash value. For example, the hash value can be a MD5 signature or a SHA1 signature.

In an embodiment, the signature is a similarity signature. In an embodiment, raw execution context data of the processor on the one hand and of the circuit on the other hand can be compared. Advantageously, such a comparison can be handled rapidly.

In an embodiment, a subset of data in the execution context data can be compared. Such subsets can be determined by application of logical rules or mathematical functions. Advantageously such a specific comparison can be handled efficiently (for instance, predefined patterns of data can be identified).

In an embodiment, specific or selected data in the execution context data can be compared. Complex logical rules (for example chained logical rules which can be applied on the raw execution context data) advantageously can allow performing deep analysis of the execution context data.

In an embodiment, one or more signatures of specific data of the execution context data can be determined and further compared with each other. Advantageously such a comparison can be performed with low latency, i.e. handled efficiently (predefined known patterns of data can be identified). The comparison of signatures can be one to many, many to one or one-to-one. In an embodiment, a signature is a checksum or a Cyclic Redundancy Check (CRC) or a hash value or equivalent. In other words, native invariance is detected (same form).

In an embodiment, a signature comprises a measure of similarity. With a predefined metrics (threshold or distance), different sets of execution context data can be determined as being equivalent or almost identical. Advantageously such a comparison can be robust against minor variations. In an embodiment (for fault tolerance), a signature can use Error Correcting Code (ECC). In an embodiment, a combination of checksums and/or similarity signatures can be used.

The detection of critical parameters within execution context data is further discussed. In an embodiment, critical parameters to be detected in ECD can be learned offline, i.e. once for all, during manufacturing or learned at some points in time and reinjected into parameters considered as "predefined critical parameters". Such critical parameters identified offline may comprise, but are not limited to function calls context data such as return address and/or stack and frame pointers backups, as well as heap metadata. Function call conventions and heap metadata are example of data whose construction is known in advance.

In an embodiment, critical parameters to be detected in ECD can be learned inline, i.e. during one or more runtimes. Via I/O interfaces (e.g. cloud computing, shared databases, etc), these critical parameters can be detected, filtered and consolidated (by man and/or machine). In other words, the list of critical parameters can be dynamic (adaptive or reactive), i.e. evolve over time, depending on execution contexts and attacks scenarios (for example). One or more logical rules (e.g. Boolean expressions, fuzzy logic, etc) can be used to handle the list of critical parameters whose presence (or absence) is to be monitored. Advantageously, one or more logical rules (corresponding to one or more security policies of higher abstraction levels) can allow to determine one or more critical parameters and/or to further select subsets of data thereof.

In an embodiment, the circuit is further configured to verify the integrity of execution context data and/or of one or more signatures thereof.

In an embodiment, the integrity of the execution context data (and signatures thereof) can be checked or verified, before use (e.g. reusing it).

In an embodiment, the circuit is configured to use a secret key to authenticate one or more signatures.

In an embodiment, the secret key is an encryption key which comprises a symmetric encryption key which is used to ciphering and/or signing the hash value with said symmetric key. In other embodiment, asymmetric encryption can be used. In an embodiment, the hardware checksum function can comprise a symmetric cryptography function which can be used for ciphering the checksum with a key stored in the hardware. Examples of such symmetric cryptography function include but are not limited to AES, 3DES. In an optional embodiment, the hardware checksum function can comprise an asymmetric cryptography function which can be used for signing the checksum with a key stored in the hardware. Examples of such hash function include but are not limited to RSA, ECDSA.

In an embodiment, the secret key is randomly initialized, preferably during the initialization of the processor.

In an embodiment, the secret key can be different for each process, thread or task running on the system.

In an embodiment, the secret key is generated using a Physically Unclonable Function (PUF) and/or a challenge-response device.

In addition, the temporal moments or instants to perform such integrity verifications can vary. In an embodiment, the integrity is verified before reentering the code section to which it belongs or before it is moved within the processor. In an embodiment, verifications are performed periodically. In an embodiment, verifications are performed at random. In an embodiment, verifications are performed in parallel to execution of software code (e.g. execution data is used while verification is still taking place). The latter embodiment can be efficient in terms of cost, while slightly decreasing the security (the detection of the attack with some latency remains an acceptable trade-off). In an embodiment, integrity verification can be performed sequentially, i.e. before context data is used, or in parallel to context data usage (for example on/by another core of a multiprocessor, or on a dedicated checksum verification circuit). Combinations of the preceding embodiments are possible (verifications can be performed in parallel for some time, and then become sequential, while independent periodic heartbeat verifications are performed in background).

Triggers of such integrity verifications can be diverse (see the embodiments related to the copy of execution context data, context-dependent, time dependent and/or event dependent).

In an embodiment, the secret key is used in a HMAC mode.

HMAC is a cryptographic method which uses a secret key in conjunction with a hash function to compute an input message's authentication code. In an embodiment, the hardware checksum function can comprise a hash function which can be used in HMAC mode, with a key stored in the hardware. Examples of such hash function include but are not limited to SHA-2, SHA-3, and MD5.

In an embodiment, the secret key is distributed in the hardware.

In an embodiment, the secret key is generated by a true random generator. A True Random Number Generator (TNRG) is a device that generates random numbers from a physical process (e.g. quantum mechanics, quantum random number generator), rather than a computer program.

In an embodiment, the secret key is generated by a pseudo-random number generator (software and/or hardware). The pseudo-random number generator can be initialized by a TRNG prior to generating the secret key.

In some embodiments, the HMAC key and/or the symmetrical cryptography key and/or the asymmetrical cryptography secret key can be initialized randomly during CPU initialization. For example, output from a true random number generator can be used.

In an embodiment, the secret key is stored on a non-volatile memory. In some embodiments, one or more secret keys can be stored in non-volatile memory on the chip. In some embodiments, one or more secret keys can be generated using Physically Unclonable Functions (acronym PUF).

In an embodiment, the structure of stored execution context data comprises one or more of a heap, a linked list, a tree, a table, a hash tables and a graph. Advantageously, complex data structures can be manipulated by the system according to the invention, not only registers' values.

In an embodiment, the sub circuit configured to compare signatures of execution context data, is a part of a DMA controller and/or of the bus interface of the processor.

Different parts of the system can compare signatures and/or (raw) execution context data. In an embodiment, only the processor (by definition provided with processing capabilities) does compare execution context data and/or signatures thereof. In an embodiment, only the circuit does compare data and/or signatures. The latter embodiment is advantageous in the sense that, if the processor happens to be compromised at some point, it may not be able to perform comparisons with integrity (or any comparison at all); having a dedicated circuit part for handling the comparison also can provide increased performance. In an embodiment, both the circuit and the processor perform the comparisons, e.g. for improved fault resilience. The latter embodiment is advantageous as it may provide redundancy, a key feature in some technical domains such as automotive or aeronautic applications. In an embodiment, the checksum/signature computation is performed separately (twice), both in/by the processor and in/by the circuit and a further level of comparison can be implemented. In an embodiment, the checksum/signature computation and/or verification is performed by a plurality of dedicated circuits or devices.

In an embodiment, the checksum comparison mechanism can be directly integrated in a DMA controller. Advantageously, checksum values and associated comparisons can be performed during memory transfers (e.g. transfer of sensitive data from a secure memory to an external SDRAM memory).

In an optional embodiment, the checksum computation and verification mechanism can be directly integrated in the processor's bus interface, to transparently perform generation and integrity tests when necessary. Activation and deactivation of the checksum generation/verification function can for example be configured through internal dedicated registers and/or by the processor super user bit and/or by an external register mapped on the bus and/or by a dedicated input signal. The dedicated input signal can be controlled for instance by another processor's core.

In an embodiment, the software program is one or more of an executable instruction, a plurality of executable instructions, a thread of executable instructions, a plurality of threads, a task, or a software process.

The granularity of the invention to handle comparisons can range from one executable instruction to a standalone software application (by increasing granularity: one executable instruction, a plurality of executable instructions, a thread of executable instructions, one or more threads of executable instructions, an operating system process comprising a plurality of threads, a task, a standalone application or "app" or "software program" or "application").

In an embodiment, the circuit is configured to control the processor.

The circuit according to the invention can have a passive role, but it also can endorse an active role in some embodiments. For example, the circuit can exercise some control on the processor, for example based on comparisons performed on execution context data or signatures thereof. Control actions of the circuit may comprise one or more of stopping, resuming, rebooting or restarting the processor and/or one or more of a software processes in execution thereon.

A diversity of corrective and/or preemptive actions based on the comparisons (whether execution context data and/or signatures do match or not) is indeed possible.

Corrective and/or preemptive actions can comprise one or more of: doing nothing, setting a flag, modifying one or more thresholds applied or used to control the processor, resetting one or more parts of the processor (temporary or not), deactivating one or more parts of the processor (permanently or not), alerting the processor to anticipate an unqualified or tentatively qualified attack; killing one or more services and/or ports and/or sandboxing one or more processes, executing active defense (for example by executing predefined defense mechanisms), partially deleting data (e.g. local secrets), for example by wiping out memory units, performing a global deletion of memory content (for example if attacks are repeated, logging or recording incidents, uploading specific data, alerting devices connected to the system incorporating the processor, renegotiating a user session, suspending the processor's current execution thread, resuming, triggering soft and/or hard reboot of the system comprising the computer, disconnecting power, physically damaging the processor (e.g. to protect data, for example by self-destruction, wrapping-up hardware junctions, logging relevant information, further limiting the current process/thread/task access rights and privileges, enabling additional monitoring features, enabling sandboxing, etc).

In an embodiment, signatures or checksums are compared. If the checksums match or correspond, then the processor can pursue its (normal) execution. If the checksums do not match then the processor can stop or resume execution. Alternatively, the processor can optionally trigger a reset and/or a reboot operation. Alternatively, the OS can terminate the corrupted task while allowing other tasks to continue. While terminating the corrupted task, the OS may store or send to a dedicated service, to a dedicate device or server additional information for later analysis including, for example, corrupted data and expected signature, current position in the program, state of the processor's registers, state of the memory. Alternatively, the OS can set a flag or a register and terminate the task using dummy data, not to inform the hacker that the corruption has been detected.

In an embodiment, a custom action can be triggered as defined in the security policy (for example embodied in logical rules). The custom action may comprise stopping the corrupted software or process, erasing secret data, generating security log entries and triggering system security audit functions.

In an embodiment, the processor can trigger a security handler to log and/or analyze the event before terminating the process and/or resuming the execution despite the corruption.

In an embodiment, the checksums comparison can be performed by the hardware checksum function (block). In this case, the comparison result can be accessed through registers, and a mismatch can optionally trigger a security exception in the processor in hardware (advantageously increasing the performance).

In an embodiment, the circuit is configured to restore execution context data in the processor.

In an embodiment, critical security parameters e.g. execution context data (in parts or as a whole) can be later restored from memory to the processor. This for example can happen upon context switch between two applications.

In an embodiment, the circuit is deactivable on demand.

In an embodiment, an alert is triggered upon detection of a mismatch in the comparisons between execution context data and/or signatures thereof. The alert can be local or global to the device. For example, the alert can be communicated to the Operating System level, or any component (software or hardware) responsible for handling security events. In some embodiments, alerts can use audio, visual and/or haptic feedback to human users (e.g. vibrations, sounds, display, etc). The alert can also be sent to another process, another device or to a server.

Specific embodiments are now described.

Figure 2:
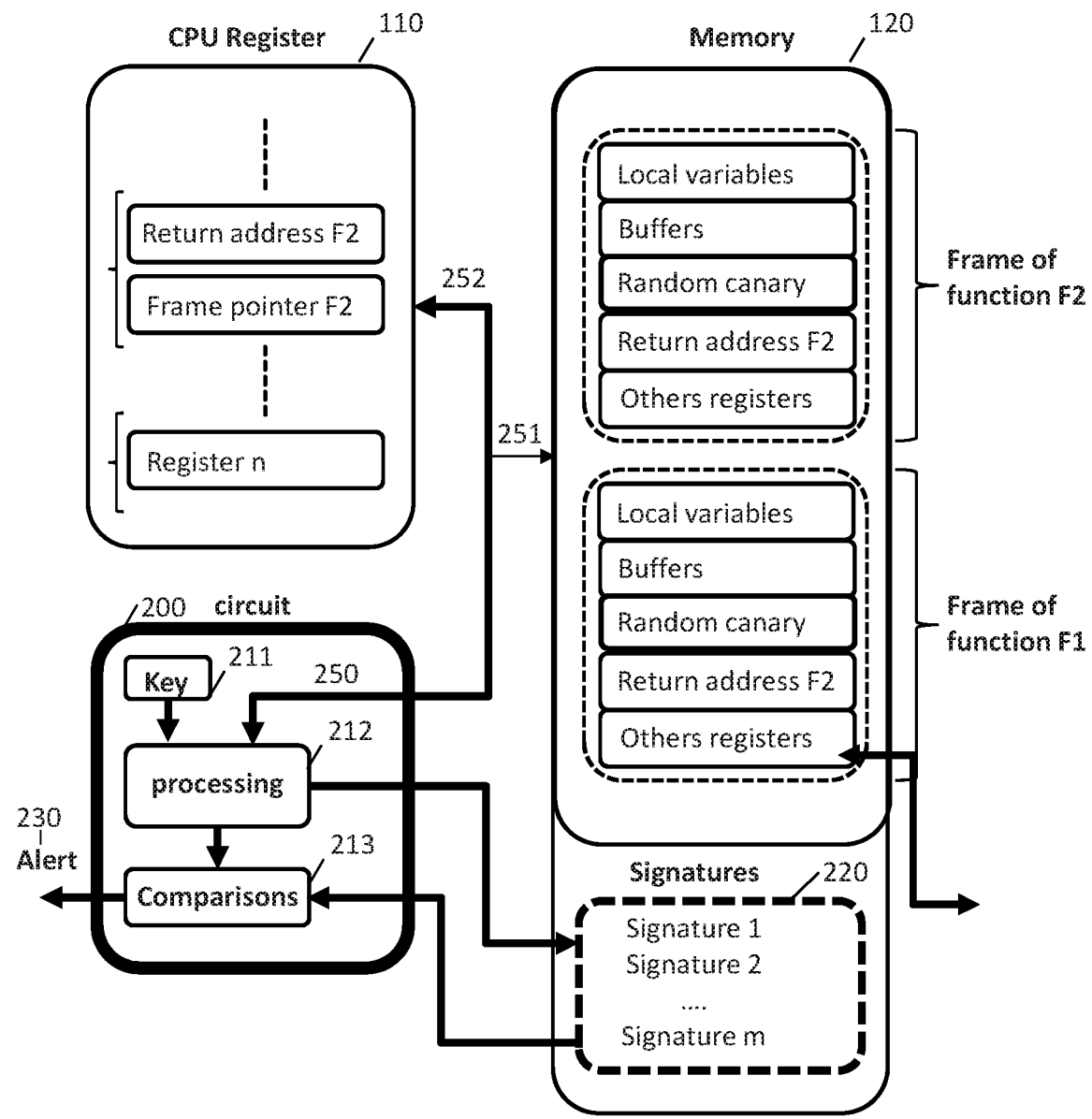
FIG. 2 illustrates an embodiment of a secure system according to the invention.

FIG. 2 illustrates some aspects of a secure system according to the invention.

Compared with the previous figure, the system comprises an additional circuit 200. In an aspect, the circuit 200 is configured to receive or collect or retrieve or intercept or capture execution context data out of the register of the processor. Data is generally copied. The data copy can be triggered in different ways:

In an embodiment, the copy is triggered or controlled 250 by the circuit 200, from the register to the memory 251, upon the detection of a CALL instruction in the execution stack of instructions. In an embodiment, the copy is triggered or controlled, from the memory to the register 252, upon the detection of a RET instruction in the execution stack of instructions.

In an embodiment (SPARC environment), the copy is triggered or controlled 250 by the circuit 200, from the register to the memory 251, upon the detection of a windows overflow. In an embodiment, the copy is triggered or controlled, from the memory to the register 252, upon the detection of a windows underflow. A window overflow/underflow is a SPARC CPU functional event.

In the circuit 200 according to the invention, one or more signatures (or other credentials such as fingerprints, imprint) are determined out of the copied execution context data. Signatures or credentials can be computed using a combination of hash, symmetric and asymmetric cryptography functions. In an embodiment, a credential is computed by computing the hash value of the copied data. In an embodiment, the hash function used belongs to the SHA-2 family. In another embodiment, the hash function belongs to the SHA-3 family In another embodiment, the hash function is constructed by chaining a block cipher such as AES, TDES, PRESENT or a stream cipher such as Trivium, Grain. In another embodiment, a signature of the copied data is computed using a symmetric cryptography function such as a block cipher or a stream cipher and a secret key or using a hash function and a secret key. Advantageously, the attacker cannot forge a new signature without knowing the secret key. Examples of such schemes comprise but are not limited to HMAC, CMAC, and GMAC. In another embodiment, the copied data is signed using asymmetric cryptography functions and private key. Example of asymmetric cryptography signature schemes include but are not limited to RSA, DSA, and ECDSA. Said one or more signatures (e.g. checksums, etc) are stored into the memory (or in another memory unit).

Further in time, new instructions are executed (e.g. calls for functions) and execution context data is continuously received. New signatures are then computed and stored accordingly.

When copied data is read back from memory, signatures are compared 213. If signatures are not identical, an alert 230 is triggered (to the processor and/or to the Operating System and/or to a software program, etc).

The duration and/or occurrence of comparison cycles can be configurable. Compromises or trade-offs are different. For example, finer granularity yields better reactivity/security but is more resource intensive than coarser granularity. In an embodiment, signatures are compared each and every time copied data is read back from memory. In some other embodiments, other heartbeats or comparison timeframes can be used. In some embodiments, comparisons are performed as a function on one or more of an executable instruction, a call, a frame, a thread or an Operating System process.

In an embodiment, the circuit according to the invention comprises a first hardware circuit 212 to generate signatures and a second circuit 213 to verify generated signatures. In an embodiment, these two circuits can be the same circuit, to reduce the total circuit size. In an embodiment, signature (checksum) generation and/or verification can be implemented in hardware and/or in software. In an embodiment, these functions can be implemented entirely in software.

In a further embodiment, one or more secret keys 211 can be used. In order to prevent the attacker from generating valid signatures or checksums, the checksum computed on the critical data can use a secret value, for example stored in the hardware.

Various embodiments for the storage and retrieval of the key(s) are possible. The storage can be distributed in the hardware, can be protected using PUFs, etc. Diverse mathematical functions can be used. Various encryption mechanisms can be applied. In an embodiment, the secret value or "key" is not known by the software. In an embodiment, the key is randomly initialized during CPU initialization. In an embodiment, Message Authentication Code (MAC) can be used. In cryptography, a message authentication code (MAC) is a piece of information used to authenticate a message (to confirm the authenticity and the integrity of the information). A MAC algorithm, also called a keyed (cryptographic) hash function takes as input a secret key and an arbitrary-length message to be authenticated, and outputs a MAC or tag. The MAC value protects the message's data integrity and its authenticity, by allowing verifiers' entities (possessing the secret key) to detect any changes to the message content. MAC algorithms can be constructed from other cryptographic primitives, such as cryptographic hash functions (as in the case of HMAC) or from block cipher algorithms (OMAC, CBC-MAC and PMAC). Some fast MAC algorithms such as UMAC and VMAC are constructed based on universal hashing. MAC algorithms can thus be one or more of a one-time MAC, CMAC, Hash-based message authentication code (HMAC), MMH-Badger MAC, Poly1305-AES, UMAC, VMAC, etc.

Figure 3:
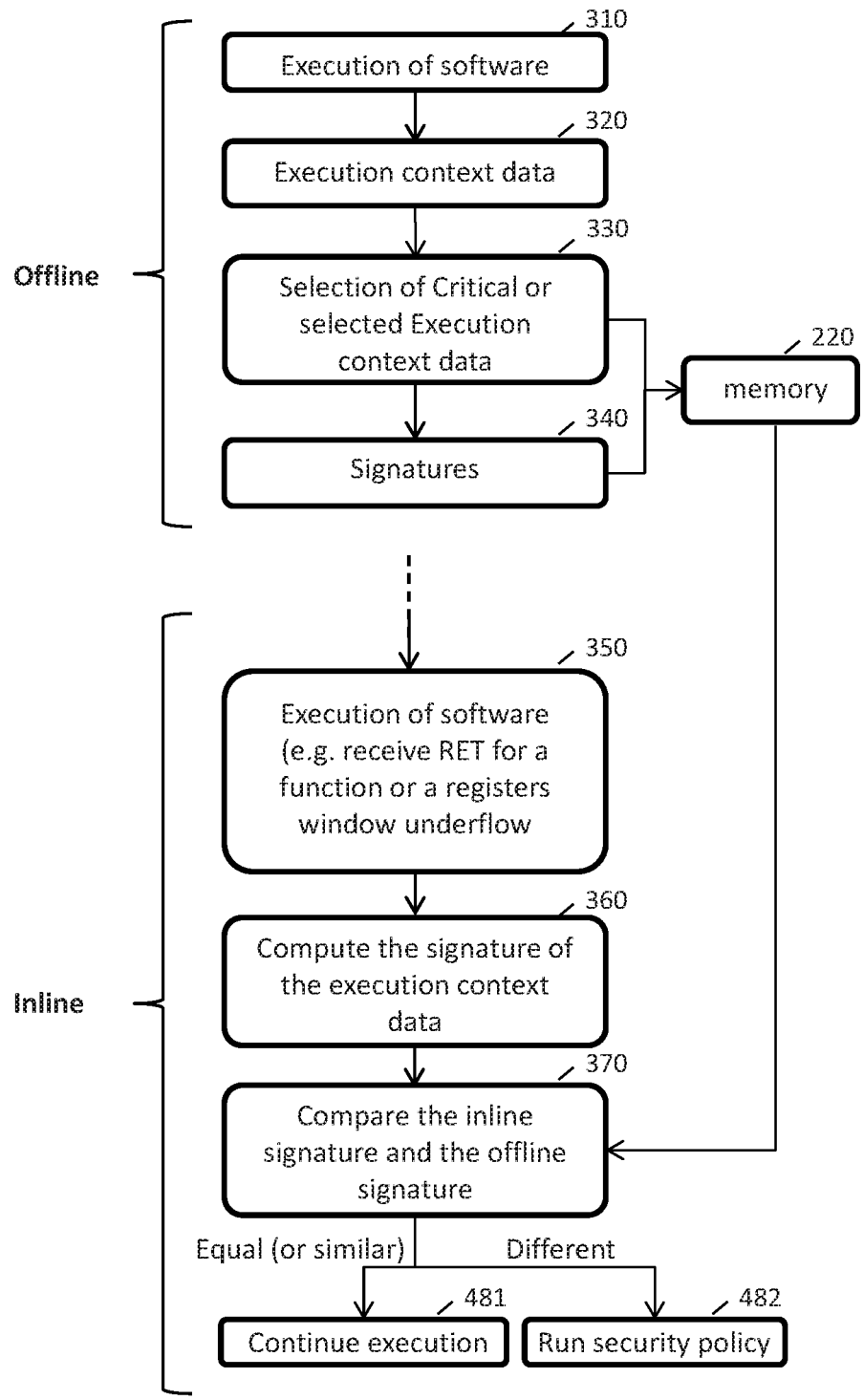
FIG. 3 shows examples of steps of the method according to the invention.

FIG. 3 shows examples of steps of an embodiment of the invention.

The figure in particular underlines temporal aspects of the invention.

Offline (or first or learning or initialization) steps are first described. Offline steps are those which can be performed beforehand and result into predefined values encoded into hardware accessible circuits. At step 310, a piece of software is executed. Execution context data associated with said execution is then determined at step 320. An optional selection of said raw execution context data can be performed at step 330: critical execution context data. In an embodiment, data which is relevant to security is selected (relevancy is evaluated according to one or more predefined criteria). In an embodiment, a random selection is performed. In an embodiment, copied data related to a subset of the currently running processes or tasks is selected (the quality of relationship can be quantified and determined according to one or more thresholds). This selection can be stored into the memory 220 (or into a plurality of memory units). One or more signatures (e.g. checksums, similarity signatures, etc) of said execution context data and/or critical/selected execution context data are determined at step 340. The processing of said signatures can be performed in a purely hardware embodiment, in a mixed hardware/software embodiment or in a purely software embodiment. These one or more signatures selection can be stored into the memory 220 (or into a plurality of memory units), along raw data (optional).

These offline steps also can be performed continuously inline. As far as the processor executes software programs or instructions, execution context data can be accumulated and processed accordingly.

Inline steps are now described. Upon executing a piece of software, execution context data is received or collected at step 350. One or more signatures are derived thereof at step 360. Said one or more "inline" signatures are compared with "offline" (i.e. previously stored) signatures at step 370. If signatures are determined to be equal (or similar under a distance threshold), execution of the software program is pursued (i.e. no security exception is raised) at step 481. If signatures are determined to be different (or dissimilar in excess of a distance threshold), execution of the software program is interrupted (i.e. a security exception is raised and/or a counter-measure is taken). The counter-measure could be a fake execution of the last part of the software program, to simulate a nondetection of the attack to the attacker.

Figure 4:
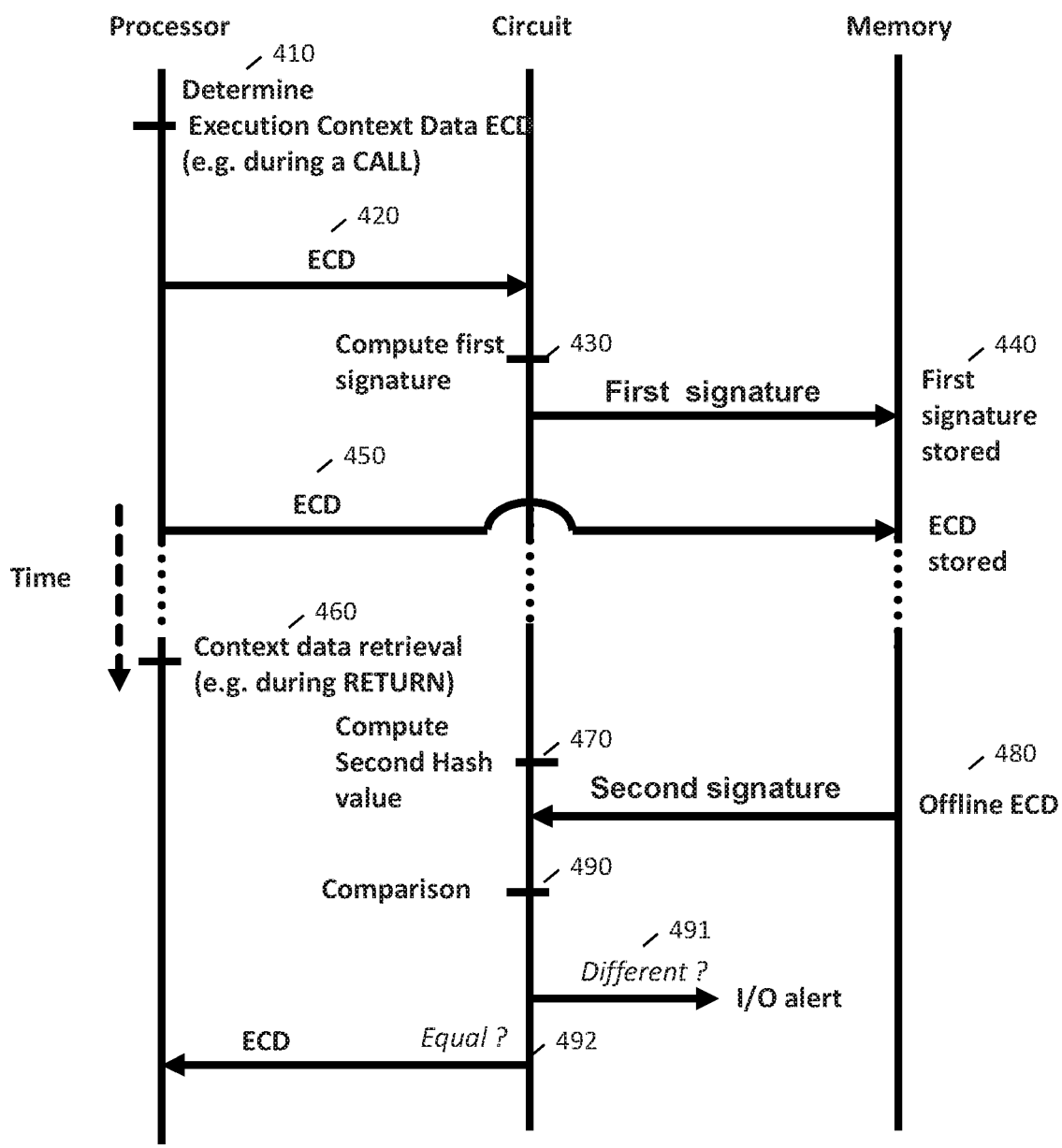
FIG. 4 shows examples of steps of an embodiment of the invention, illustrating different interactions between different system components.

FIG. 4 shows various embodiments of the invention, from a system perspective. The figure underlines some specific embodiments, wherein the processor, the memory and the circuit endorse specific exemplary roles.

At step 410, first execution context data is received or determined in response to the execution of a software program.

At step 420; the processor (optionally selects and) writes the critical data from the processor's internal registers to the checksum generation hardware function, embodied in the circuit in the figure. A (offline, first) signature is obtained. The signature is stored in the memory at step 440.

At step 450 (after the copy to the circuit, or beforehand, or simultaneously depending on the embodiments) the processor copies the same execution context data from the processor's internal registers to the memory, which stores said data.

Later on, at step 460, upon receiving second execution context data, the processor computes another (online, second) signature thereof.

At step 480, this triggers the retrieval from the memory of a previously stored signature corresponding to the second execution context data.

At step 490, the first and second signatures are then compared (for example in or by the processor, or in or by the circuit, or in or both circuits).

If the first and second signatures do not match, an I/O alert is triggered at step 491.

If the first and second signatures do match, execution context data is restored to the processor internal registers at step 492 and execution of the software program can continue.

In an embodiment, the comparison of signatures is performed before using the critical data (just-in-time detection of any corruption if applicable).

In an embodiment, the verification is performed while using the critical data (on-the-fly detection of any corruption if applicable).

The disclosed methods can take form of an entirely hardware embodiment, an entirely software embodiment or an embodiment containing both hardware and software elements. An entirely hardware embodiment is advantageous in terms of performance and power consumption. Software embodiments include but are not limited to firmware, resident software, microcode, etc and are advantageous regarding updates capabilities. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The invention claimed is:

1. A system comprising:
a processor,
an operating system and
a circuit,
wherein the processor comprises at least one register and a memory, the processor and the operating system being configured to execute a software program, the software program comprising a plurality of functions, and wherein execution context data are produced and stored in the memory during execution of the software program by the processor and the operating system; and
wherein the circuit is separate and operates independently from the processor and is configured to monitor security of the processor, and wherein the circuit is configured to:
access at least a part of the execution context data,
store at least a part of the accessed execution context data in a circuit memory of the circuit,
determine one or more signatures from the at least a part of the execution context data,
compare the one or more signatures with predefined signatures,
detect an attack against the processor if the one or more signatures do not match the predefined signatures based on the comparing,
restore the execution context data to the at least one register of the processor if the determined signatures match the predefined signatures,
wherein the circuit is further configured to use a key to verify an integrity of the execution context data, and the verification is performed in parallel to the execution of the software program; and
wherein the circuit is configured to control the processor based on the comparing and/or the execution context data.

2. The system of claim 1, wherein the one or more signatures comprise one or more hash values.

3. The system of claim 1, wherein the key is randomly initialized during an initialization of the processor.

4. The system of claim 1, wherein the key is generated using a Physically Unclonable Function and/or a challenge-response device.

5. The system of claim 1, wherein the key is used in a HMAC mode.

6. The system of claim 1, wherein the key is generated by a true random generator.

7. The system of claim 1, wherein the key is stored on a non-volatile memory.

8. The system of claim 1, wherein a sub circuit configured to perform the comparing is a part of a Direct Memory Access controller and/or of a bus interface of the processor.

9. The system of claim 1, wherein the software program further comprising one or more of: 1) an executable instruction, 2) a plurality of executable instructions, 3) a thread of executable instructions, 4) a plurality of threads, 5) a task, or 6) a software process.

10. The system of claim 1, wherein an alert is triggered upon a detection of a mismatch in the verification.

11. The system of claim 1 wherein the processor and the circuit access physically and/or logically distinct memories.

12. The system of claim 1 wherein the execution context data are accessed, in response to a change in the execution context data if the operating system switches between different software programs and/or at predefined time intervals according to a data capture frequency determined based on a clock frequency of the processor and/or depending on volumes of accessible data.

* * * * *